(No Model.)
H. LAWSON.
OYSTER DREDGE WINDLASS.
No. 355,271. Patented Dec. 28, 1886.
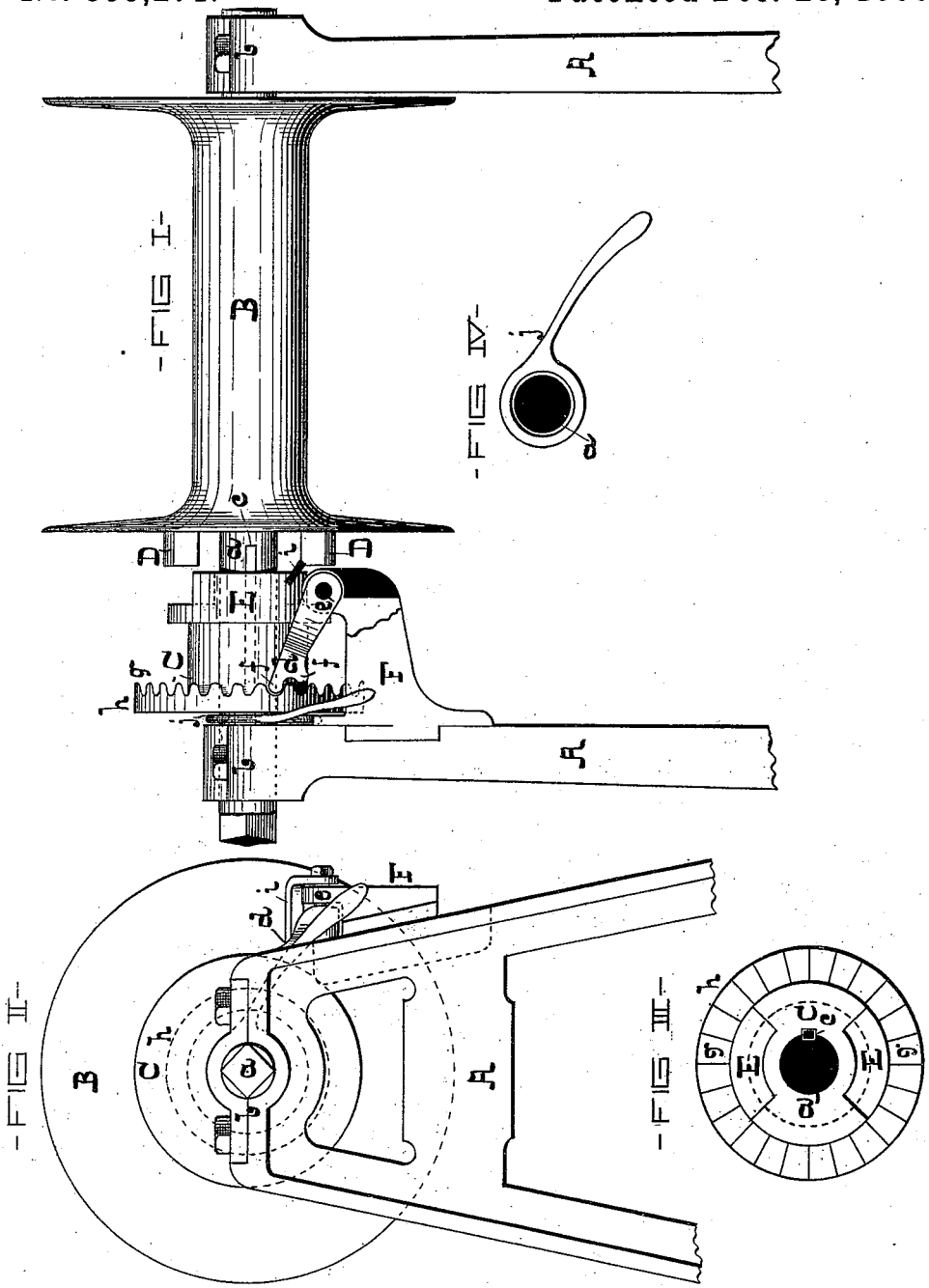
WITNESSES
Dan'l Fisher
Edward J. Moore
INVENTOR
Henry Lawson,
by G. W. & H. J. Howard,
atty.

UNITED STATES PATENT OFFICE.

HENRY LAWSON, OF BALTIMORE, MARYLAND, ASSIGNOR TO VIRGINIA S. LAWSON, OF SAME PLACE.

OYSTER-DREDGE WINDLASS.

SPECIFICATION forming part of Letters Patent No. 355,271, dated December 28, 1886.

Application filed February 27, 1886. Serial No. 193,404. (No model.)

*To all whom it may concern:*

Be it known that I, HENRY LAWSON, of the city of Baltimore and State of Maryland, have invented certain Improvements in Oyster-Dredge Windlasses, of which the following is a specification.

The object of this invention, in common with others of its class, is to prevent accidents from the rotation of the cranks or handles of the windlass in a reverse direction, owing to the dredge attached to the winding-rope being caught by a rock or other obstruction during the dredging operation, as will hereinafter fully appear.

In the accompanying drawings, forming a part hereof, Figure I is a side elevation of the improved windlass, with a portion of the stand removed, and other parts shown in section. Fig. II is an end view of Fig. I. Figs. III and IV are details of the windlass.

A is the stand of the windlass, and B the barrel on which the dredge-rope (not shown) is wound. The barrel is placed loosely on the shaft $a$, which is supported in boxes $b\ b$, forming parts of the stand A.

C is a clutch adapted to slide on the shaft $a$, and $c$ is a feather in the shaft to prevent the clutch being rotated independently of the shaft.

D D are lugs on the face of the barrel, and E E are similar lugs on the end of the sliding clutch next to the barrel.

F is a bracket bolted or otherwise fastened to the stand A, and $d$ is a pawl, pivoted at $e$ to the said bracket, having teeth $f$ of different lengths at its outer end, arranged to engage with similar teeth, $g$, arranged on the inner face of the flange $h$ of the clutch. A stop, $i$, limits the upward movement of the pawl $d$.

The clutch is forced in gear with the barrel by hand, through the medium of a shifter, $j$. When the clutch is in gear with the barrel, the motion of the shaft in a winding direction is imparted to the clutch from the feather $c$, and from the clutch to the barrel by means of the lugs D and E. During the winding operation the pawl trips on the teeth $g$ and is inoperative; but should the barrel and clutch be revolved in a reverse direction, by reason of the dredge catching a rock, the pawl forces the clutch out of gear with the barrel, and the latter is then free to revolve independently of the clutch, shaft, and cranks.

I claim as my invention—

In a dredge-windlass, the combination of the stand A, rotary shaft $a$, confined endwise in bearing-boxes in the said stand, and provided with the feather $c$, barrel B, having the lugs D, adapted to turn freely on the shaft $a$, clutch C, resting on and adapted to slide longitudinally of the feathered portion of the shaft $a$, and having at one end flange $h$, provided with the facial teeth $g$, and at the other the lugs E E, and the pawl $d$, pivoted to some stationary part of the stand, and adapted to fall in gear with the teeth $g$, substantially as specified.

HENRY LAWSON.

Witnesses:
WM. T. HOWARD,
DANL. FISHER.